United States Patent [19]

Daman et al.

[11] Patent Number: 5,327,726

[45] Date of Patent: Jul. 12, 1994

[54] STAGED FURNACES FOR FIRING COAL PYROLYSIS GAS AND CHAR

[75] Inventors: Ernest L. Daman, Westfield; Francis D. Fitzgerald, Phillipsburg; Robert J. Zoschak, Glen Rock, all of N.J.

[73] Assignee: Foster Wheeler Energy Corporation, Clinton, N.J.

[21] Appl. No.: 886,893

[22] Filed: May 22, 1992

[51] Int. Cl.$^5$ ............... F01K 17/00; F01K 23/04
[52] U.S. Cl. .................................. 60/648; 60/655; 60/676
[58] Field of Search .......... 60/676, 653, 655, 648, 60/683

[56] References Cited

U.S. PATENT DOCUMENTS

| | | | |
|---|---|---|---|
| 3,840,354 | 10/1979 | Donath | 48/202 |
| 4,209,982 | 7/1980 | Hermsdorf et al. | 60/682 X |
| 4,223,529 | 9/1980 | Willyoung | 60/655 X |
| 4,229,185 | 10/1980 | Sass | 48/197 |
| 4,312,639 | 1/1982 | Johnson | 48/210 |
| 4,322,222 | 3/1983 | Sass | 48/197 |
| 4,356,077 | 10/1982 | Che | 208/8 R |
| 4,385,905 | 5/1983 | Tucker | 48/62 R |
| 4,397,656 | 8/1983 | Ketkar | 48/202 |
| 4,429,536 | 2/1984 | Nozawa | 60/648 X |
| 4,469,488 | 9/1984 | Calderon | 48/202 |
| 4,474,583 | 10/1984 | Chen | 48/187 R |
| 4,541,246 | 9/1985 | Chang | 60/648 |
| 4,563,197 | 1/1986 | Steinberg | 48/210 |
| 4,578,175 | 3/1986 | Gorin | 208/8 R |
| 4,594,140 | 6/1986 | Chang | 208/414 |
| 4,597,776 | 6/1986 | Ullman | 48/197 R |
| 4,872,886 | 10/1989 | Henley | 48/197 R |
| 5,181,381 | 1/1993 | Gounder | 60/648 |

*Primary Examiner*—Edward K. Look
*Assistant Examiner*—Hoang Nguyen
*Attorney, Agent, or Firm*—Marvin A. Naigur

[57] ABSTRACT

A pyrolyzer unit and two-staged furnaces are provided in a compact furnace assembly for combusting coal to generate power. Coal is reacted in the pyrolyzer to produce a clean hot fuel gas and char. The hot fuel gas is combusted in the first-stage furnace, which contains a high-temperature heat exchanger utilized to heat a pressurized air stream for expansion in a gas turbine and a heat exchanger for superheating steam for expansion in a steam turbine to produce power. Char is combusted in the second-stage furnace and the resulting combustion products are mixed with primary combustion gas from the first-stage furnace to product a secondary combustion gas and preheat the pressurized air stream, and also to superheat steam. The heated air stream is expanded in a gas turbine to produce shaft power to drive an air compressor and an electric power generator. The hot secondary combustion flue gases and hot air exhaust from the gas turbine are used for preheating pressurized water to generate the steam for the steam turbine cycle.

22 Claims, 3 Drawing Sheets

STAGED FURNACES FOR FIRING COAL PYROLYSIS GAS AND CHAR

BACKGROUND OF INVENTION

This invention pertains to staged combustion furnaces used for burning pyrolysis gas and char to produce hot combustion gases and generate power from coal in a process utilizing both air and steam turbines. It pertains particularly to two-stage furnaces in which a pyrolysis gas derived from coal is combusted in a first stage containing a high temperature compressed air heat exchanger and a steam superheater. Char from the first stage and coal as required, are combusted in a second stage furnace in which the compressed air is preheated and steam is initially superheated.

In a high-efficiency coal-fired combined power cycle using a high temperature (Brayton Cycle) air turbine together with a steam (Rankine Cycle) turbine for generating electric power on both turbine shafts, it is desirable to raise the temperature of the Brayton Cycle working fluid (air) to at least 1800° F. This requires high-temperature combustion gases which, when derived directly from coal, will be at a temperature at which both vaporized and molten ash constituents are present. Such ash constituents in the hot gases could cause corrosion and plugging of heat exchanger tubes, which need to be made of a suitable high temperature material e.g. a ceramic such as silicon carbide for the air heat exchanger, and metallic alloy for a steam superheater. Because the cost of such heat exchanger tubing is high, a closely packed heat exchanger is desirable so as to minimize the amount of heat transfer surface required.

Processes utilizing staged combustion of coal are known, as disclosed by U.S. Pat. No. 3,840,354 to Donath, U.S. Pat. No. 4,229,185 and 4,322,222 to Sass, U.S. Pat. No. 4,312,639 to Johnson, U.S. Pat. No. 4,469,488 to Calderon, and U.S. Pat. No. 4,900,429 to Richardson. However, these processes and associated furnace equipment have various deficiencies, so that improved more compact furnace combustion equipment and a process for more efficient staged combustion of coal to generate power have been needed. An improved combustion furnace assembly including a pyrolyzer unit and two-staged combustion furnaces has now been developed, in which coal is first pyrolyzed to produce pyrolysis gas and char. The pyrolysis gas is used to fire a first stage furnace containing an air heater and high temperature steam superheater. The char is used to fuel a second stage furnace in which the combustion gas therein is advantageously quenched by the primary combustion gases from the first stage furnace.

SUMMARY OF INVENTION

This invention provides a furnace assembly including a coal pyrolyzer unit and two staged combustion furnaces used in a process for efficiently burning coal to generate power. The furnace assembly utilizes a pyrolyzer reactor unit having feeding means for coal and air. The pyrolyzer unit is connected to a first-stage combustion furnace having at least one high temperature heat exchanger contained therein. A second stage combustion furnace is provided adjacent to or below the first stage furnace, and ducts for conveying hot flue gases extend vertically and transversely from the second-stage furnace to heat recovery exchangers, all units being arranged in a compact assembly.

For this two-stage furnace assembly, coal feed is first pyrolyzed with limited air in the pyrolyzer reactor unit to produce a fuel gas from the coal volatiles and form char. This fuel gas is combusted with additional air in the first-stage furnace, which contains high-temperature heat exchangers for final heating pressurized air as a Brayton Cycle fluid, and final superheating steam for a Rankine cycle. Char from the pyrolysis reactor is then used to fuel the second-stage furnace, in which a secondary combustion gas is produced and quenched by introducing the primary combustion gases from the first-stage furnace. The combined secondary combustion gas streams are utilized in the second stage furnace to preheat the pressurized air as the Brayton Cycle fluid, before it enters the high temperature heat exchanger located in the first stage furnace for further heating before expansion in a gas turbine to generate power. The secondary combustion gases in the second stage furnace are also utilized to superheat pressurized steam prior to its final superheating in the first-stage furnace and expansion in a steam turbine to generate power. In order to protect the air preheater tubing in the second stage furnace from being exposed to molten ash derived from the char combustion therein, the secondary combustion gases are advantageously quenched by the fuel gas primary combustion products from the first stage furnace. Without such gas quenching, it would be impractical to provide heat exchange surfaces in the second-stage furnace for preheating air and superheating steam for efficient use in the gas and steam turbines.

This improved staged furnace assembly for burning coal and generating power according to this invention advantageously provides a compact and cost effective facility for coal combustion and power generation that has increased reliability and reduced installation costs.

BRIEF DESCRIPTION OF DRAWINGS

The invention will now be described with reference to the following drawings, in which.

DETAIL DESCRIPTION OF INVENTION

Figure 1:
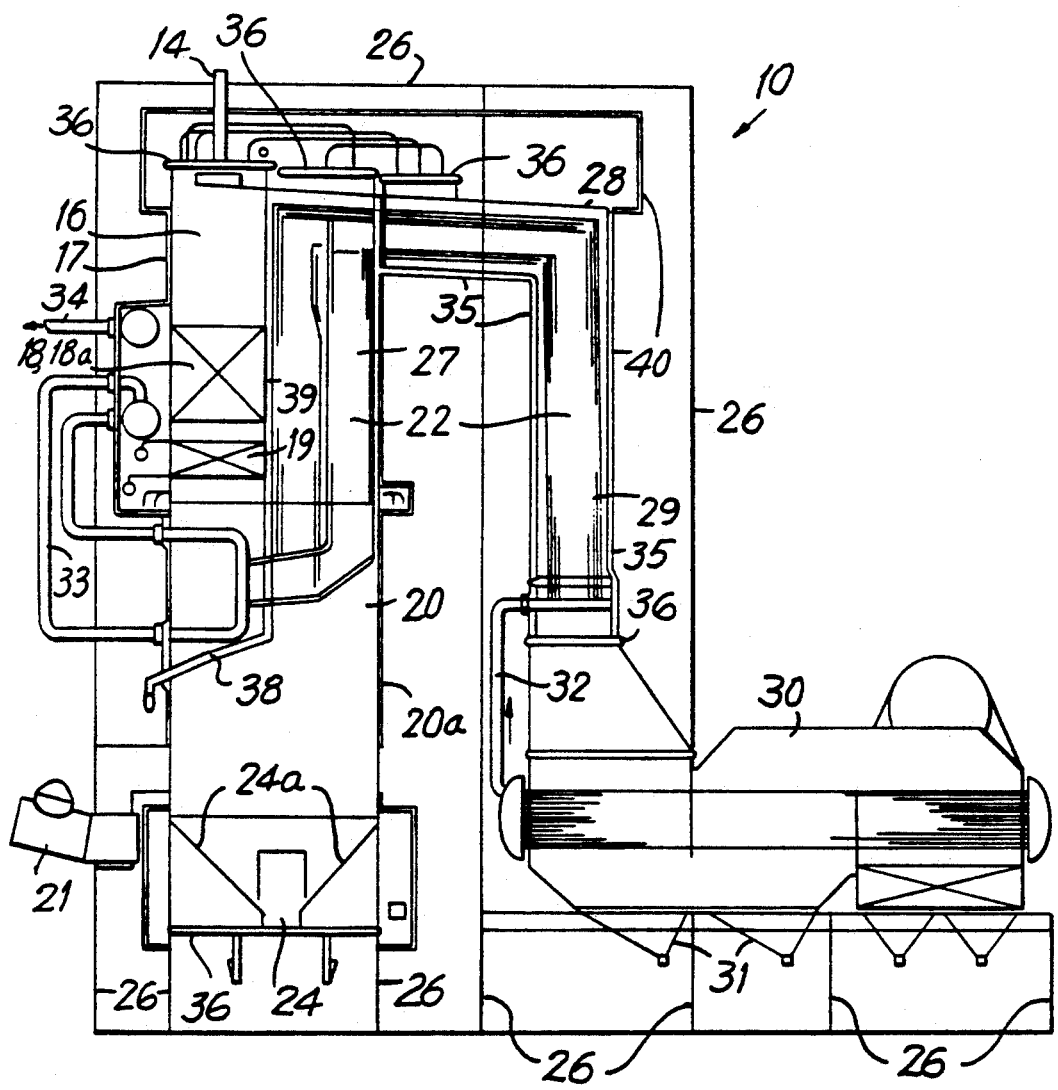
FIG. 1 shows an elevation view of a furnace assembly consisting of a two-stage furnace and auxiliary heat exchangers utilized for coal combustion and fluid heating in a power generation process.

As shown in the FIG. 1 elevation drawing, furnace assembly 10 utilizes a pyrolyzer reactor unit (not shown) into which coal and a suitable sorbent material can be fed for reaction therein to produce a desulfurized fuel gas. Located downstream from the pyrolyzer unit is a cyclone separator (not shown) used for separating clean fuel gas from entrained pyrolyzer char material.

The clean fuel on pyrolysis gas from the cyclone separator is piped at 14 to a first-stage combustion furnace 16 in which the gas is combusted to produce a primary combustion gas. The first-stage furnace 16 contains a high temperature heat exchanger 18, which is made of a suitable high temperature ceramic material such as silicon carbide or equivalent material, for heating compressed air to be expanded in a gas turbine (not shown) to produce shaft power. In heat exchanger 18, the tubes 18a are closely spaced so as to provide high surface area in a small volume of furnace. The first-stage furnace 16 also preferably contains a heat exchanger 19 for final superheating steam generated in other heat exchangers (not shown). This superheated steam is conveyed in a piping system (not shown) to a steam turbine (not shown) where it is expanded to generate additional shaft power.

The first stage furnace 16 has refractory-lined walls 17 and is located above or adjacent to a larger second-stage combustion furnace 20, in which the char from the pyrolyzer unit together with some additional coal, if necessary, are combusted in a combustor unit 21 and the resulting hot combustion gas is tempered by mixing with relatively cool combustion gas discharged from the first-stage furnace 16. In second stage furnace 20, an air preheater unit 22 is provided in the furnace upper portion for preheating pressurized air, which air is further heated up to 1400°-1800° F. temperature in the heat exchanger 18 located within the first stage furnace 16. Ash is withdrawn from the lower portion of the second stage furnace 20 at 24 as controlled by inclined baffle surfaces 24a. The second stage furnace 20 and associated heat exchangers are suitably supported by structural means indicated at 26.

From the upper end of the second-stage furnace 20, vertical duct 27, horizontal duct 28 and vertical duct 29 convey hot flue gases past preheater 22 to a primary compressed air preheater 30 for heating a Brayton Cycle compressed air stream. During operation, pressurized air is supplied to the primary air preheater 30 from a compressor (not shown). Ash particulates can be removed at 31 from the primary air preheater 30, as needed. Heated compressed air conveyed by piping 32 from the preheater 30 is further heated in the air preheater platens 22 contained within the ducts 27, 28 and 29 and conveyed through piping 33 to the high temperature ceramic heat exchanger 18, from which it is conveyed through piping 34 to a gas turbine (not shown) where it is expanded to generate shaft power. The hot exhaust gas from the gas turbine is used to heat water in feed water heaters and boilers (not shown) to generate steam.

The flue gas ducts 27, 28 and 29, as well as the staged furnaces 16 and 20, are lined with tubes 35 terminating in upper and lower headers 36. These tubes, together with screening tubes 38, comprise a primary superheater 25 in which steam generated elsewhere in the power cycle is heated before entering the finishing superheater 19. The screening tubes 38 are bent upwardly in a single plane where they are welded together to form a gas-tight wall 39 separating the first-stage furnace 16 from the vertical duct 27. The second stage furnace 20 has thermally-insulated walls 20a. A thermally-insulated casing or enclosure 40 is provided around the staged furnace assembly 10 so as to minimize undesired heat losses to the atmosphere. This compact and unique furnace arrangement including a pyrolyzer unit together with first and second stage combustion furnaces is advantageously provided in a compact, easily installed assembly for producing power from the combustion of coal reliably and economically.

Figure 2:
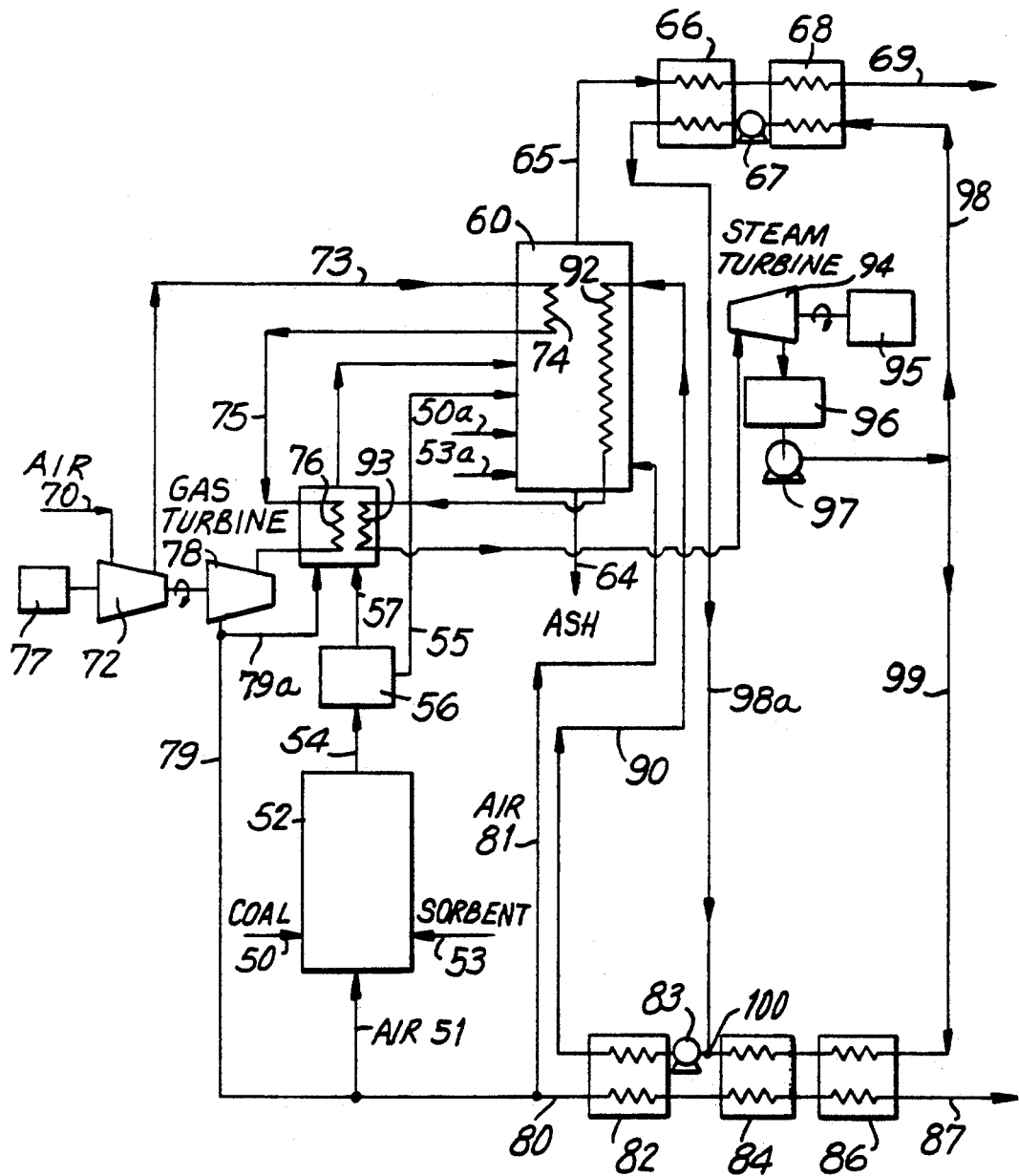
FIG. 2 shows a combined process for power generation from coal in which coal feed is first pyrolyzed and the resulting fuel gas and char are combusted separately in two staged furnaces, and heated pressurized air and superheated steam are each expanded to produce shaft power or electricity.

Operation of the two-staged furnace assembly will now be described in greater detail based upon the FIG. 2 process flowsheet. As shown in FIG. 2, coal provided at 50 along with hot air supplied at 51 and optionally a sulfur-capturing sorbent material such as calcium carbonate supplied at 53 are all fed to a pyrolyzer reactor unit 52, where they are reacted together to produce a pyrolysis or fuel gas at 54 derived mainly from the coal volatile matter, and also to produce partly combusted coal particles or char. The fuel gas at 54 is passed to a gas-solids separator 56, from which the unreacted char is removed at 55. The resulting clean fuel gas at 57 is passed to a first stage furnace 58, where it is combusted to produce a primary combustion gas at 59 and to heat a compressed air stream therein to about 1800° F. in high temperature heat exchanger 76 provided therein as further described hereinbelow.

From the first-stage furnace 58, the primary combustion gas stream 59 is passed to a second-stage furnace 60, where it is mixed with secondary combustion gases produced therein resulting from burning char supplied at 55 with additional air supplied at 81 in the second stage furnace 60. The char at 55 includes some coal ash and partially sulfided sorbent material, resulting from the coal pyrolysis reaction at pyrolizer reactor 52. Additional coal that may be required to support combustion of the char in furnace 60 is supplied at 50a, and sorbent may be supplied at 53a. The primary combustion gas 59 serves to quench and cool the secondary combustion gas so as to limit its temperature and prevent damage to heat exchanger surfaces 74 in the second-stage furnace 60. The second stage furnace 60 preheats compressed air at 74 as the fluid for a Brayton cycle to about 1400° F., before it enters the high-temperature heat exchanger 76 in first-stage furnace 58 for further heating as described below. The second stage furnace 60 also superheats pressurized steam provided at 90 in superheater 92, which steam is expanded in steam turbine 94 to produce shaft power. From the second stage furnace 60, ash is withdrawn at 64 and the hot flue gases at 65 are passed successively through heat exchangers 66 and 68 to recover heat by heating recycled condensate water, and the flue gases are then discharged at 69.

Atmospheric air provided at 70 is compressed by compressor 72 and the pressurized air stream 73 is heated by the preheater surface 74 provided in the second stage furnace 60. Heated air stream 75 is further heated in the high-temperature ceramic heat exchanger 76 76 to about 1800° F., and is then expanded in gas turbine 78 to produce shaft power needed to drive the air compressor 72 and generate electric power at generator 77. A portion 79a of the turbine expanded air stream 79 is supplied as combustion air to the first-stage furnace 58, another portion is supplied at 51 to pyrolyzer reactor unit 52, and a third portion is supplied at 81 to the second-stage furnace 60. The remaining expanded air portion 80 is cooled successively in heat exchangers 82, 84 and 86 by heating recycled condensate water streams 98a and 99 to form steam, after which the cooled air is discharged to the atmosphere at 87. Because the hot air stream 80 passing through heat exchangers 82, 84 and 86 does not have ash or combustion products entrained therein, stream 87 does not require pollution abatement equipment or provision for corrosion control.

The pressurized recycled steam at 90 is further heated in heat exchanger 92 provided in the second-stage furnace 60, is preferably further superheated in heat exchanger 93 provided in first-stage furnace 58, and the superheated steam is then expanded through steam turbine 94 to produce shaft power and generate electric power at generator 95. The resulting low pressure steam from turbine 94 is condensed at condenser 96, and the resulting condensate water is repressurized by condensate pump 97 and further by boiler feed pumps 67 and 83. A first portion 98 of the pressurized condensate water from pump 97 is heated successively in the economizer exchangers 68 and 66 against the hot flue gases 65, and provides a first portion 98a of the recycled steam at 90. A second portion 99 of the condensate water is heated successively in the heat exchangers 86 and 84 against hot waste gas stream 87, to provide a second portion of the recycled steam at 90. The portions 98a and 99 are combined at 100 so that the full flow of steam at 90 is heated in exchanger 82 against hot waste gas stream 80.

Figure 3:
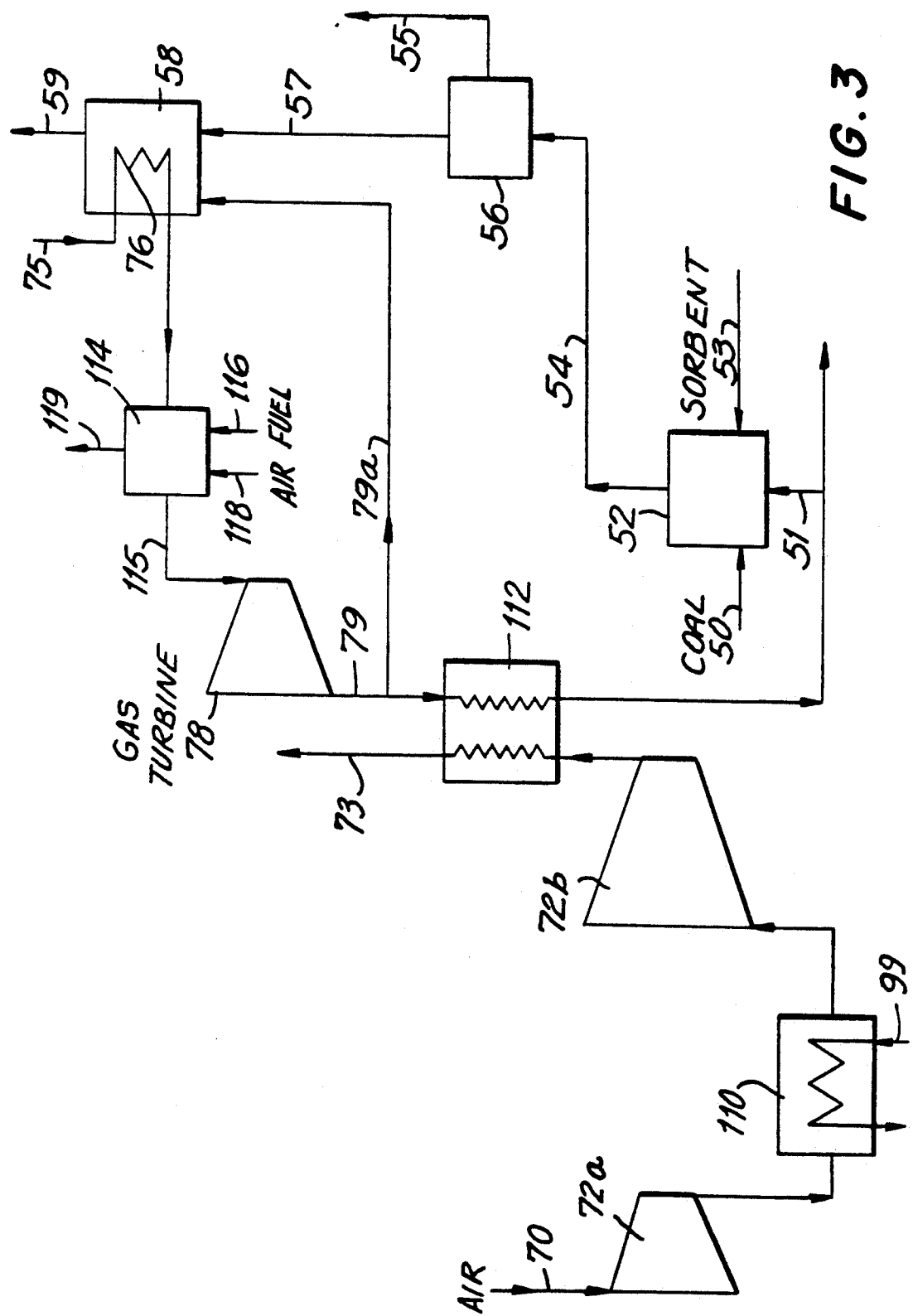
FIG. 3 is a partial flowsheet showing an alternative arrangement for a power generation process from coal, in which the compressed air is intercooled, heat is exchanged between the compressed air and turbine exhaust streams, and the pressurized preheated air is further heated in a fuel fired burner so as to improve the overall cycle efficiency of the process.

The overall thermal efficiency for this coal-fired power generation cycle per FIG. 2 can be improved by utilizing two-stage air compression and also preheating the compressed air stream to the second-stage furnace by utilizing heat from the gas turbine hot exhaust. As shown by the FIG. 3 partial flowsheet, the thermal efficiency of air compressor 72 can be improved by utilizing two stages 72a and 72b of compression separated by an intercooler 110, in which the air is cooled against a cooler stream such as steam condensate stream 98 or 99. Also, the compressed air stream 73 discharged from air compressor 72 can be advantageously heated against the gas turbine hot exhaust stream 79 in a direct or an indirect type heat exchanger 112. If desired, the heat exchanger 112 may be a known type indirect liquid-coupled heat exchanger, which advantageously reduces the compressed air stream 73 pressure drop. Also if desired, the heat exchanger 112 can be replaced by a heat pipe type air heater (not shown). The use of intercooling at 110 for staged air compressor 72 in combination with the heat exchanger 112 not only results in improved cycle efficiency, but also advantageously partially decouples the air turbine cycle from the coal fired equipment, which simplifies start-up procedures for the process.

In a further desired arrangement, the preheated compressed air stream 75 which is additionally heated at surface 76 in the first-stage furnace 58, can be further heated from about 1800° F. up to 2000°-2400° F., by utilizing an auxiliary fuel fired burner 114 located upstream of the gas turbine 78 so as to provide hot air stream 115 to the gas turbine. The burner 114 can be fired with a portion of the clean fuel gas 57, or by an auxiliary fuel gas or oil stream provided at 116 along with combustion air provided at 118. Flue gas is removed from burner 114 at 119.

This invention will be further described by the following Examples, which should not be constructed as limiting in scope.

EXAMPLE

A furnace assembly is provided which includes a coal pyrolyzer reactor unit, a first stage combustion furnace having a high-temperature air heat exchanger and high-temperature steam superheater located in its lower portion, and a second stage combustion furnace having an air preheater and steam superheater surfaces provided therein. The pyrolyzer unit and first-stage furnace are mounted above the second stage furnace. The first-stage furnace air heat exchanger is formed of tubing made of silicon carbide or equivalent material and adapted to withstand the high temperatures therein.

Coal is fed to the pyrolyzer reactor unit where it is reacted with a sub-stoichiometric amount of air and calcium carbonate sorbent material to produce a desulfurized hot fuel gas and char. The fuel gas and char are separated, and the clean gas is combusted in a first-stage furnace to produce a primary combustion gas and to preheat a compressed air stream therein. Both the primary combustion gas and the char are fed to a second-stage furnace. The char is combusted together with additional coal, if necessary, as required to support combustion, and the combustion products therefrom are mixed with the primary combustion gas to generate a secondary combustion gas that is used to preheat the pressurized air stream and to generate and superheat steam. The primary combustion gas serves to limit temperature of the secondary combustion gas by admixture therewith. The hot pressurized air stream heated in the first-stage furnace is expanded in a gas turbine, and the steam superheated in the second and first stage furnaces is expanded in a steam turbine to produce shaft power.

Important parameters for the staged furnace assembly and power producing process are as follows:

| | |
|---|---|
| Pyrolysis gas exit temp., °F. | 1,400 |
| First stage furnace gas exit temperature, °F. | 1,500 |
| Second stage furnace gas exit temp., °F. | 770 |
| Air temperature to gas turbine, °F. | 1,800 |
| Air pressure to gas turbine, psig | 150 |
| Steam temperature to turbine, °F. | 1,150 |
| Steam pressure to turbine, psig | 1,350 |

Although this invention has been described broadly and in terms of a preferred embodiment, it will be understood that modifications and variations thereto can be made within the scope of the following claims.

We claim:

1. A staged furnace assembly adapted for combustion of coal to produce hot flue gases for heating air and generating steam, comprising:
   (a) a first stage furnace having inlet and outlet connections and adapted for combusting a coal-derived pyrolysis gas feed to produce a primary combustion gas effluent;
   (b) a high temperature heat exchanger provided within the upper portion of said first-stage furnace, said high temperature heat exchanger containing tubes utilizing heat resistant ceramic surfaces; and
   (c) a second stage furnace located adjacent to said first stage furnace and adapted for combusting char to produce a secondary combustion gas, and for mixing the secondary combustion gas with the primary combustion gas from the first-stage furnace, said second stage furnace having an upper conduit connection for discharging the secondary combustion gas and two bottom conduit connections adapted for coal feed and ash withdrawal, respectively, said second stage furnace containing within its upper portion a heat exchanger for preheating pressurized air and a heat exchanger for heating steam, and including conduit connection means extending between said heat exchanger for preheating pressurized air and said high temperature heat exchanger within said first stage furnace.

2. The staged furnace assembly of claim 1, wherein said second-stage furnace also has a third connection in its lower portion for feeding a sorbent material into the furnace.

3. The staged furnace assembly of claim 2, wherein a char combustion unit is provided, said char combustion unit being attached to a lower portion of said second-stage furnace.

4. The staged furnace assembly of claim 1, wherein a pyrolyzer reactor unit is provided adjacent to the second-stage furnace for providing a pyrolysis fuel gas to the first-stage furnace.

5. The staged furnace assembly of claim 4, wherein the pyrolyzer unit has inlet connections into its lower portion for coal, air, and a sorbent material, and an upper connection for exit gas.

6. The staged furnace assembly of claim 1, wherein vertical and horizontal ducts are connected to the outlet ends of said first-stage and said second-stage furnace for conveying combustion gases to heat recovery exchangers.

7. The staged furnace assembly of claim 1, wherein a thermally-insulated casing encloses the first-stage and second-stage furnaces.

8. The staged furnace assembly of claim 1, wherein a heat exchanger for superheating steam is provided within said first-stage furnace.

9. The staged furnace assembly of claim 6, wherein screening heat exchanger tubes are provided for separating said first-stage furnace from said vertical duct.

10. A staged furnace assembly adapted for combustion of coal to produce hot flue gases for heating air and generating steam, the furnace assembly comprising:
 (a) a pyrolyzer reactor unit having inlet and outlet connections and adapted for reacting coal and air to produce a pyrolysis gas;
 (b) a first stage furnace having inlet and outlet connections and adapted for combusting the coal-derived pyrolysis gas to produce a primary combustion gas effluent;
 (c) two high temperature heat exchangers provided within the inlet portion of said first-stage furnace, one of said heat exchangers containing tubes utilizing heat resistant ceramic surfaces; and
 (d) a second stage furnace located adjacent to said first-stage furnace, and adapted for combusting char to produce a secondary combustion gas and mixing the secondary combustion gas with the primary combustion gas from the first-stage furnace, said second-stage furnace having an upper conduit connection for discharging the secondary combustion gas and two bottom conduit connections for coal feed and for ash withdrawal, respectively, said second-stage furnace containing within its upper portion a heat exchanger for preheating pressurized air and a heat exchanger for superheating steam, and including conduit connection means extending between said heat exchanger for preheating pressurized air and said high temperature heat exchanger within said first stage furnace.

11. A process for combusting coal utilizing two staged furnaces and generating power, the process comprising:
 (a) reacting coal feed with air in a pyrolyzer reactor, and producing a clean fuel gas and char;
 (b) combusting the clean fuel gas with additional air in a first stage furnace and producing a primary combustion gas, while heating a pressurized air stream in a high temperature heat exchanger therein;
 (c) feeding the primary combustion gas and the char to a second-stage furnace and burning the char and producing secondary combustion gas while quenching and reducing temperature of the resulting secondary combustion gas produced therein so as to thereby protect heat transfer surfaces and to preheat the pressurized air and superheat steam therein;
 (d) further heating the preheated pressurized air against said primary combustion gas and expanding the heated air in a gas turbine for generating shaft power; and
 (e) expanding the superheated steam in a steam turbine and producing additional shaft power.

12. The process of claim 11, wherein raw combustion gases derived from said pyrolyzer reactor are separated in a gas-solids separator to produce the clean fuel gas combusted in the first-stage furnace, and from which the char is fed to the second stage furnace.

13. The process of claim 11, wherein hot expanded air from the gas turbine exhaust is cooled while heating first and second portions of recycled condensate water against the steam turbine exhaust.

14. The process of claim 11, wherein a first portion of recycled condensate water from the steam turbine exhaust is heated against secondary combustion gases from said second-stage furnace.

15. The process of claim 11, wherein a sorbent material is fed to the pyrolyzer reactor to produce a desulfurized fuel gas.

16. The process of claim 11, wherein shaft power from said gas turbine is used to compress the pressurized air stream.

17. The process of claim 11, wherein steam from the second-stage furnace is passed to the first-stage furnace and additionally heated therein before expanding the steam in the steam turbine.

18. The process of claim 12, wherein additional coal is fed along with the char to the second-stage furnace to assure combustion of the char therein.

19. The process of claim 11, wherein the pressurized air stream to said second stage furnace is heated against an exhaust gas stream from said gas turbine.

20. The process of claim 11, wherein the pressurized preheated air from the first stage furnace is further heated by a fuel fired burner located upstream of the gas turbine air inlet.

21. The process of claim 19, wherein heating the pressurized air stream to the second stage furnace against the gas turbine exhaust is provided by an indirect liquid-coupled type heat exchanger.

22. A process for combusting coal utilizing two-staged furnaces and generating power, the process comprising:
 (a) reacting coal feed in a pyrolyzer reactor with air and a sorbent material and producing a raw fuel gas containing char, then separating the raw gas and char to provide a clean fuel gas;
 (b) combusting the clean fuel gas with additional air in a first-stage furnace and producing a primary combustion gas, while heating pressurized air in a high temperature heat exchanger therein;

(c) feeding the primary combustion gas and the char to a second-stage furnace and burning the char and producing a secondary combustion gas while quenching and reducing temperature of the resulting secondary combustion gas produced therein so as to thereby protect heat transfer surfaces and to preheat the pressurized air and superheat steam therein;

(d) feeding the char from said pyrolyzer reactor to said second-stage furnace along with additional air and coal as needed for burning of the char, and producing additional secondary combustion gases while preheating the pressurized air and superheating the steam therein;

(e) further heating the preheated pressurized air against said primary combustion gas and expanding the heated air in a gas turbine for generating shaft power;

(f) expanding the superheated steam in a steam turbine and producing additional shaft power; and (g) cooling the gas turbine and steam turbine exhaust streams and heating recycled steam condensate water to generate steam.

* * * * *